Figure 1:
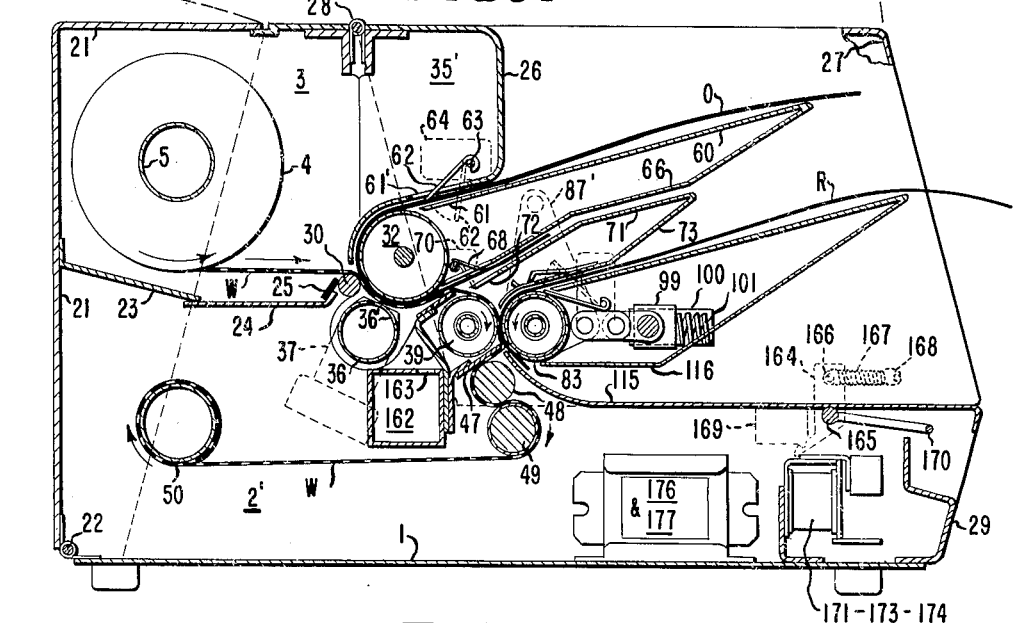

Oct. 12, 1965   R. B. HEIART ETAL   3,211,074
COPYING MACHINE
Filed Nov. 1, 1962   7 Sheets-Sheet 1

INVENTORS
ROBERT BERNARD HEIART
WILLIAM EDWARD VELVEL

BY *Lynn Barratt Morris*

ATTORNEY

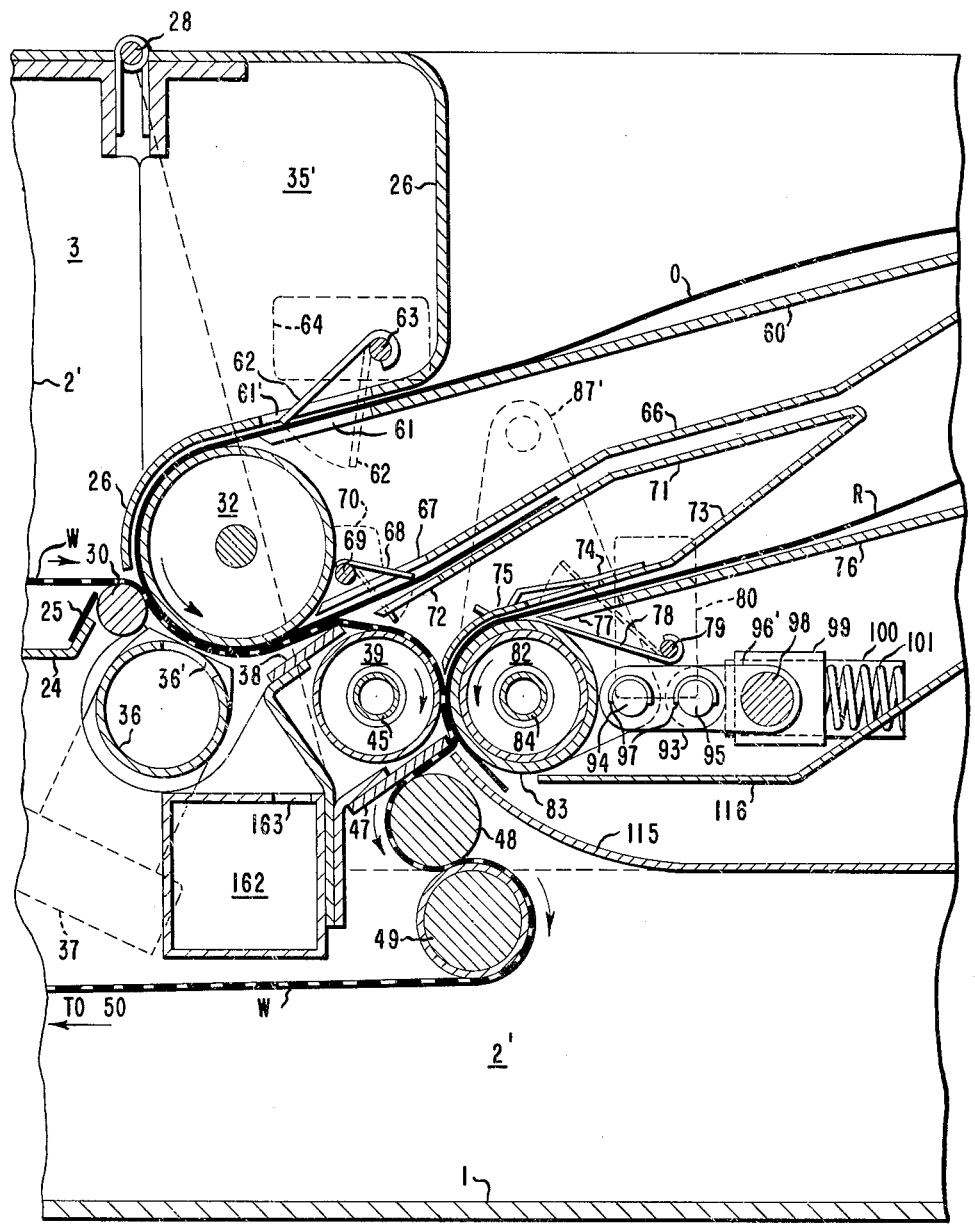
FIG. IA
INVENTORS
ROBERT BERNARD HEIART
WILLIAM EDWARD VELVEL

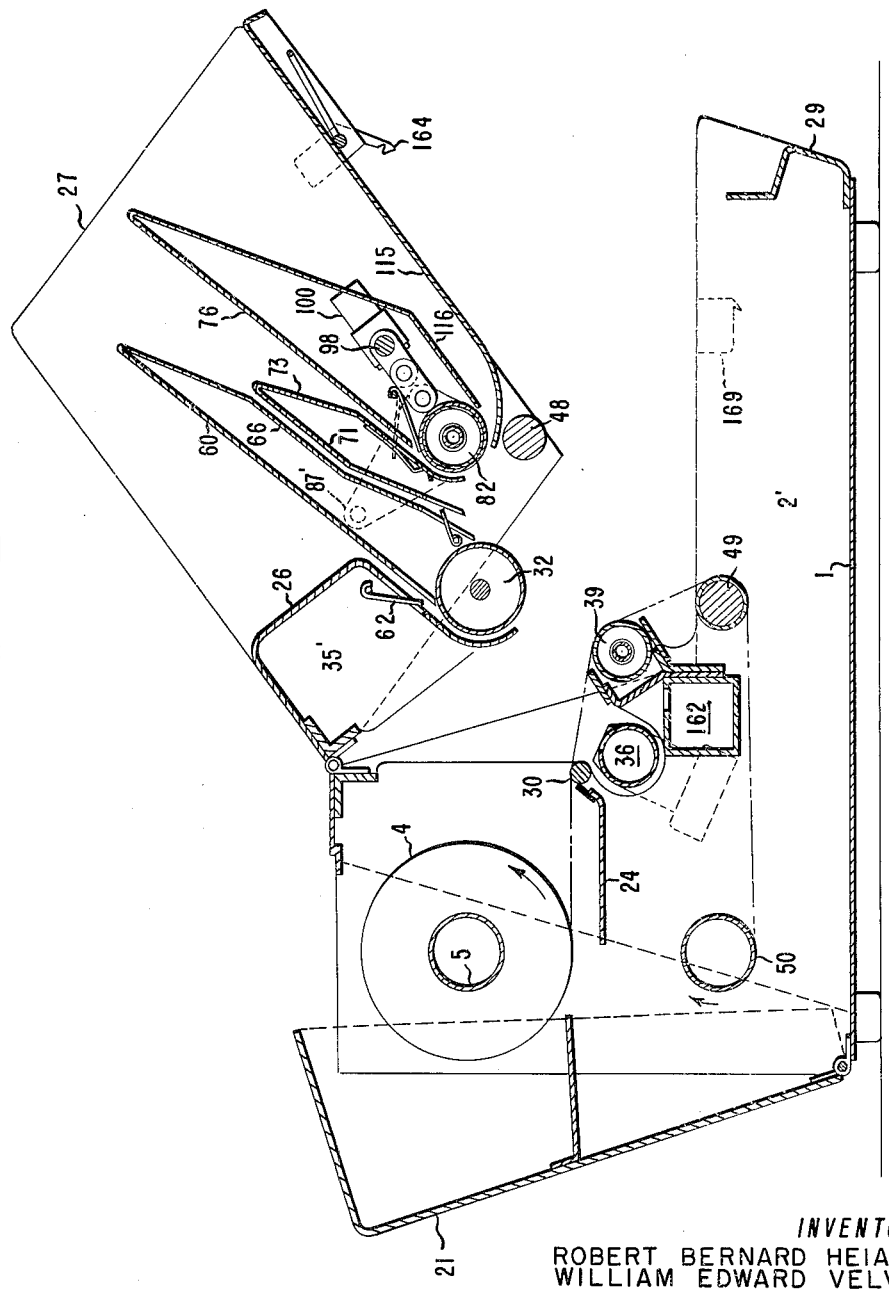

Oct. 12, 1965   R. B. HEIART ETAL   3,211,074
COPYING MACHINE
Filed Nov. 1, 1962   7 Sheets-Sheet 4
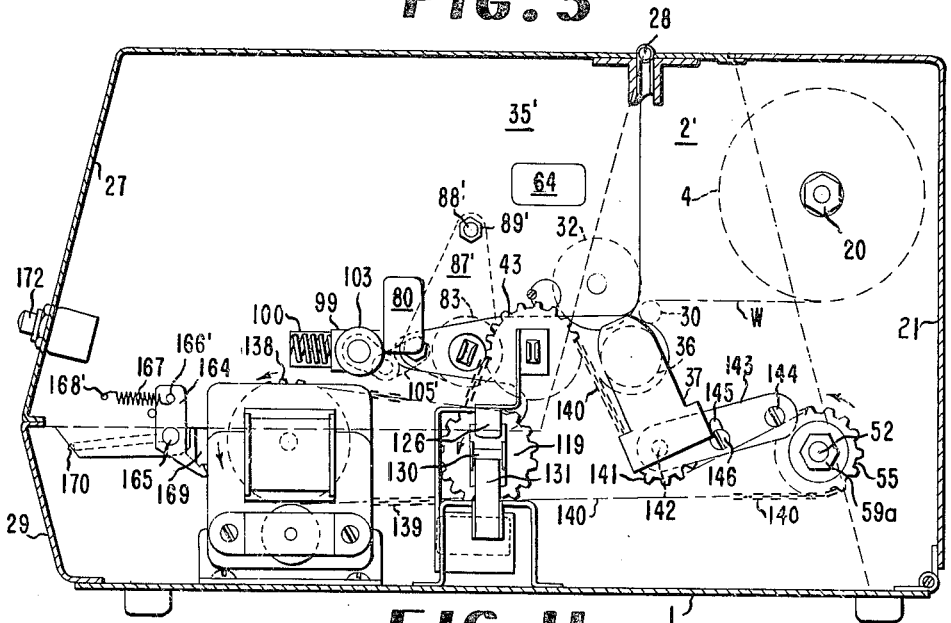
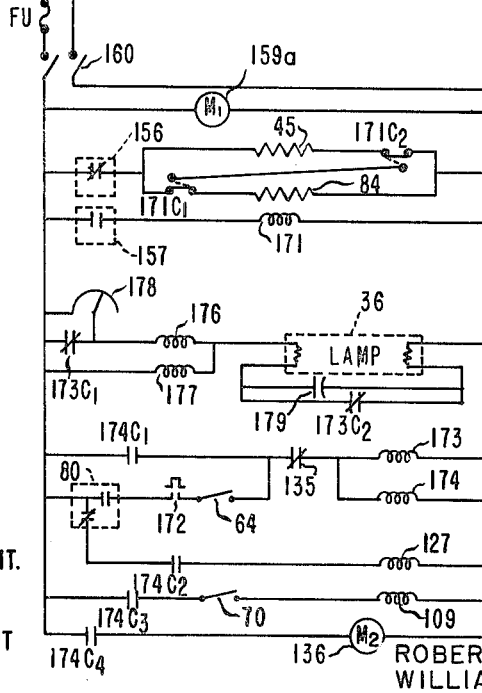
INVENTORS
ROBERT BERNARD HEIART
WILLIAM EDWARD VELVEL
BY *Lynn Barrett Morris*
ATTORNEY Oct. 12, 1965

R. B. HEIART ETAL 3,211,074

COPYING MACHINE

Filed Nov. 1, 1962

7 Sheets-Sheet 5

FIG. 4

INVENTORS
ROBERT BERNARD HEIART
WILLIAM EDWARD VELVEL

BY Lynn Barratt Morris

ATTORNEY

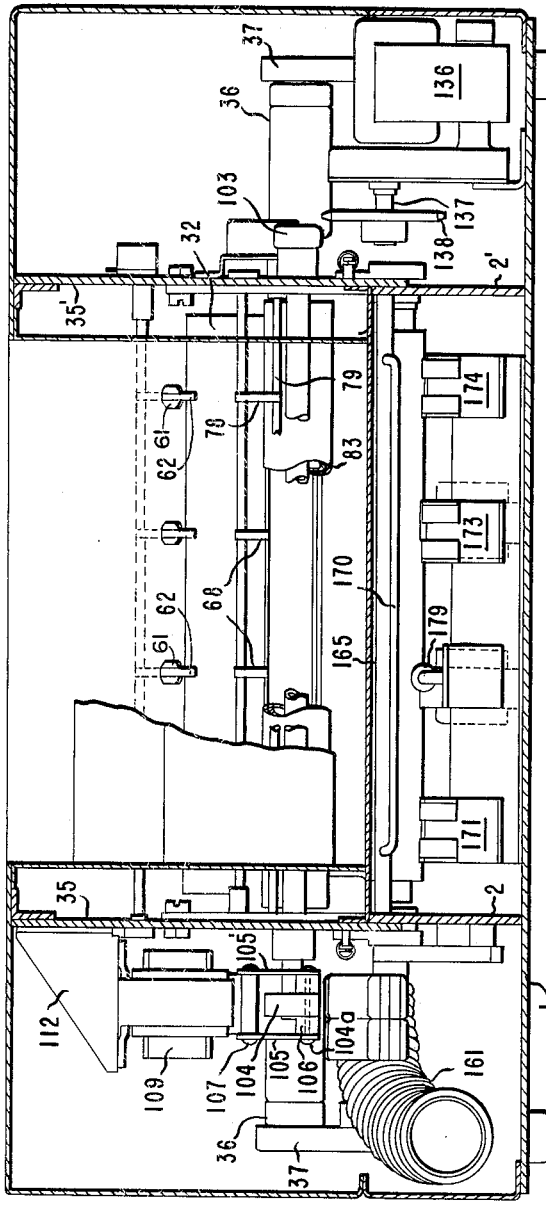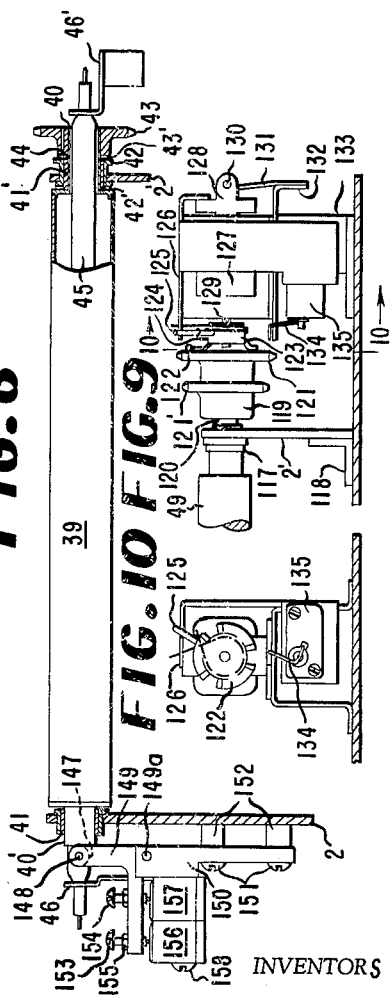
INVENTORS
ROBERT BERNARD HEIART
WILLIAM EDWARD VELVEL
BY Lynn Barratt Morris
ATTORNEY Oct. 12, 1965 R. B. HEIART ETAL 3,211,074
COPYING MACHINE
Filed Nov. 1, 1962 7 Sheets-Sheet 7

INVENTORS
ROBERT BERNARD HEIART
WILLIAM EDWARD VELVEL
BY Lynn Barratt Morris
ATTORNEY United States Patent Office 3,211,074
Patented Oct. 12, 1965

3,211,074
COPYING MACHINE
Robert Bernard Heiart, Middletown, N.J., and William Edward Velvel, Wilmington, Del., assignors to E. I. du Pont de Nemours and Company, Wilmington, Del., a corporation of Delaware
Filed Nov. 1, 1962, Ser. No. 234,616
8 Claims. (Cl. 95—75)

This invention relates to a copying machine and more particularly to a copying machine for the reproduction of flexible opaque graphic originals by photothermographic means, i.e., photographic exposure and thermal transfer means.

Various types of photocopying machines are now available in commerce and most of them use either photographic means or thermographic means for reproducing the various graphic originals, e.g., letters, documents and related line material. In general, in these machines the images are formed directly in the copy sheet. However, processes have been proposed wherein an image is formed in intermediate sheet material and the final desired facsimile image of the original is transferred to a receptor sheet that constitutes the final copy. A practical process of the latter type which embodies initial image formation by photopolymerization and thermal transfer of non-polymerized facsimile images is described in Belgian Patent 593,834, Feb. 6, 1961.

An object of this invention is to provide a new photocopying machine embodying both photographic image-forming means and thermal image transfer means. Another object is to provide such a machine that is compact in design, self-contained and dependable in operation. A further object is to provide such a machine that produces good facsimile copy, in a short period of time, of ordinary letter-size and other size original sheets. A still further object is to provide such a machine that is easy to operate and gives uniform results over a long period of time. Still further objects will be apparent from the following description of the invention.

The copying machines of this invention in their broader aspects, comprise in combination:

(1) A source of actinic light;
(2) Means for separately feeding a photothermographic matrix web having an actinic light-transmitting flexible support and an opaque image-bearing flexible sheet into surface contact and moving said sheets while in surface contact past said source of actinic light to expose said photothermographic sheet reflectrographically;
(3) Means for separating and recovering said opaque image-bearing sheet;
(4) A source of heat;
(5) Means for feeding the exposed photothermographic matrix and a receptor sheet while in surface contact past said source of heat; and
(6) Means for separating and recovering the receptor sheet bearing a facsimile image transferred from the matrix sheet.

A partical copying machine of the invention will now be described with reference to the accompanying drawings wherein—

Figure 2:
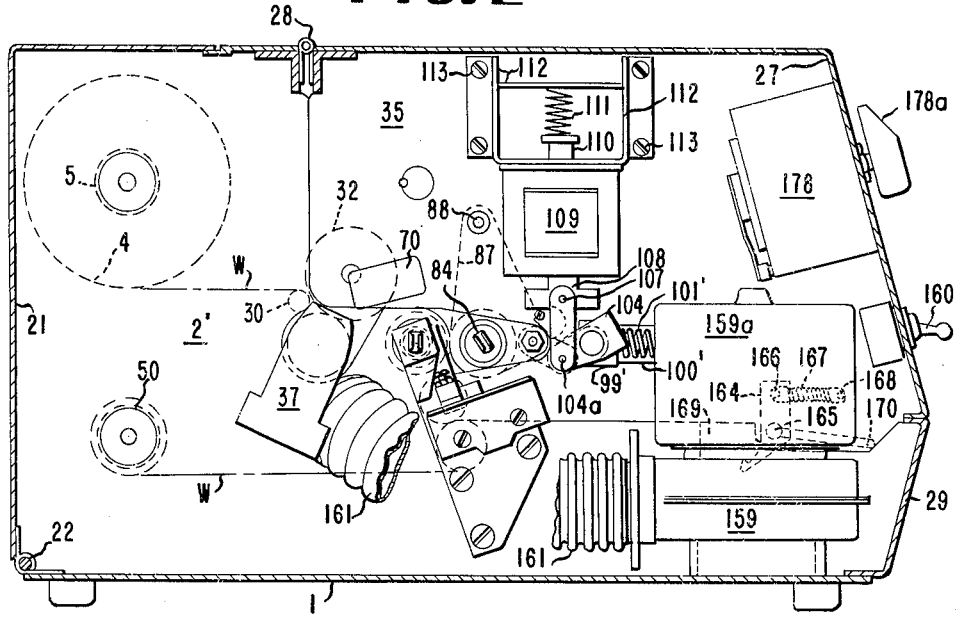
Figure 7:
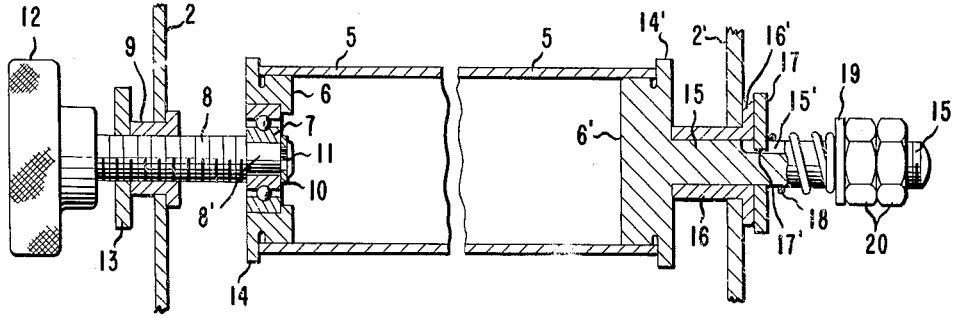
Figure 8:
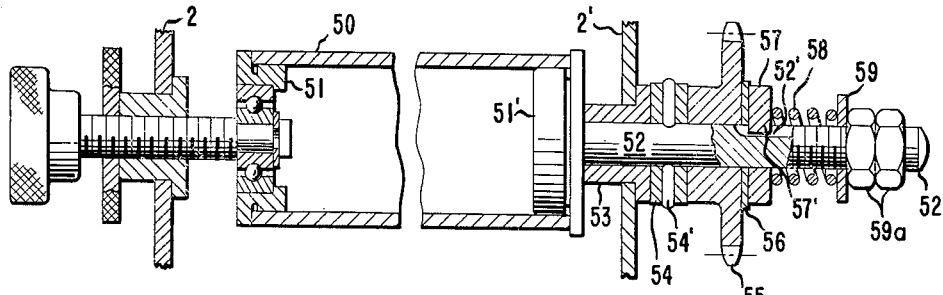
Figure 12:
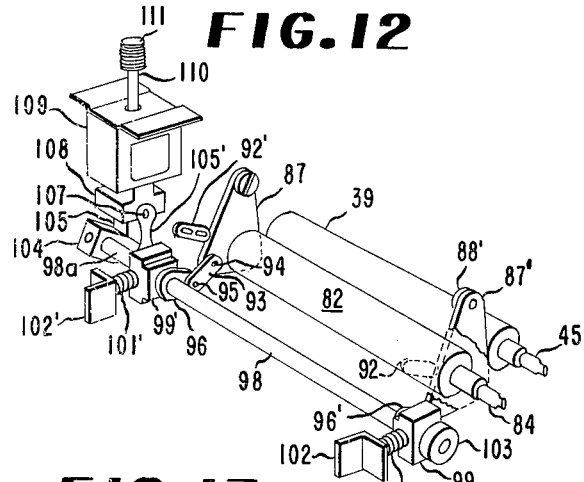
Figure 13:
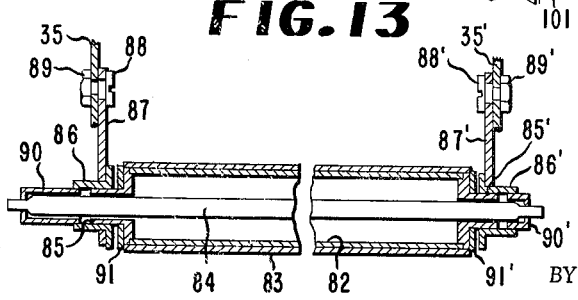

FIG. 1 is a sectional view of the copying machine taken along the line 1—1 of FIG. 4;
FIG. 1–A is an enlarged sectional view of the image-forming and image-transfer area of the machine of FIG. 1;
FIG. 1–B is a vertical sectional view of the machine with the back and top covers in partly open position.
FIG. 2 is a vertical view taken along the line 2—2 of FIG. 4 and showing in side elevation the left side of the interior of the machine;
FIG. 3 is a vertical sectional view taken along the line 3—3 of FIG. 4 and showing in elevation parts in the right side of the interior of the machine;
FIG. 4 is a plan view of the machine with portions cut away and parts in section;
FIG. 5 is a front elevation of the machine with portions cut away and parts in section;
FIG. 6 is an elevation of a detail of the heating roll and related parts, with portions cut away and parts in section;
FIG. 7 is a sectional view of the unwind spindle and its tensioning brake;
FIG. 8 is a sectional view of the wind-up spindle and its slip clutch;
FIG. 9 is a view of a detail, in elevation and in a direction toward the back of the machine, of the shut-off delay mechanism;
FIG. 10 is a view of detail of the shut-off delay mechanism taken along the line 10—10 of FIG. 9;
FIG. 11 is a schematic diagram of the electrical circuit of the machine;
FIG. 12 is an isometric view of the pressure roll operating mechanism and associated parts, and
FIG. 13 is a sectional view of the pressure roll and associated supporting members.

With reference to the drawings, where the same reference numerals refer to the same parts throughout the several views, the copying machine comprises a base 1, spaced vertical partitions 2 and 2', and a lightproof chamber 3. The latter contains a roll 4 of a thin photothermographic matrix web W that is wound on a suitable core 5. The core is supported by endcaps 6 and 6'. Endcap 6 is rotatably mounted by means of ball bearing 7 on one end of threaded spindle 8 extending through threaded socket 9 mounted in vertical partition 2. The inner end 8' of the spindle is unthreaded and reduced in diameter and interfits with the inner race of the ball bearing, said race being held in place by means of retaining ring 10 which fits into peripheral groove 11 in the spindle end of reduced diameter. The other end of the spindle has an adjusting knob 12 which can be integral with the spindle or fastened thereto in any suitable manner. After the spindle has been adjusted to the proper position, it is held in place by means of locking nut 13. Both endcaps 6 and 6' have flange portions 14 and 14' which engage the ends of the core. Endcap 6', however, has a central spindle extension 15 that extends through bushing 16, brake disk 17, spring 18 and washer 19. The end face 16' of the bushing coacts with the brake disk to retard rotation of spindle extension 15 and core 5 mounted thereon. The spindle extension 15 has threaded engagement with locking nuts 20 which compress spring 18 to hold the endcap in place and to force the brake disk against the end face of the bushing. Integral depending key 17' of the brake disk projects into keyway 15' in the spindle extension. This insures that the brake disk will rotate with endcap 6' and core 5.

The lower end of reverse L-shaped back cover 21 is fastened to the base by means of hinge 22. A lateral baffle 23 extends inwardly from the back cover and interfits with the vertical partitions 2 and 2' and coacts with lateral baffle 24 extending between the vertical partitions. The inner end of this baffle is provided with a flexible opaque gasket 25, also extending between the partitions. A pivotal front baffle 26 coacts with the back cover and the lateral baffles to form the enclosed light-proof chamber. This front baffle, for a short distance, forms a part of the top cover of the machine. It then extends downwardly for a short distance, then curves inwardly, slants downwardly and has a downwardly curved end portion. The front baffle, as well as front covers 27, pivot on hinge 28 in the top rear portion of the machine. Below the front covers and fastened to the base are vertical front cover plates 29 which coact with the hinged front covers.

The photothermographic matrix web W unwinds from the roll and passes through a narrow slot between the flexible gasket 25 and the end of the curved bottom front baffle 26 and around guide roller 30 that is journaled in suitable bearings 31 on the vertical partitions. The matrix web then passes around a sector of the bottom surface of an exposure drum 32 while in contact with a suitable opaque image-bearing sheet O, transported around the drum. The exposure drum has trunnions 33 on each end that interfit with bearings 34 mounted on the hinged vertical partitions 35 and 35' (see FIG. 4).

A tubular exposure lamp 36 is disposed beneath the exposure drum and adjacent the guide roller 30. This exposure lamp has a light-transmitting area 36' which directs the actinic radiation in a narrow band toward the exposure drum, through matrix web and to reflect from the opaque image-bearing sheet O to be copied. The lamp is provided with end sockets 37 which are connected to a source of electrical power. As the light-exposed matrix web leaves the exposure drum, it passes over the edge of deflecting plate 38 extending between the vertical partitions. The web is then deflected and passes downwardly toward heating roll 39 while the opaque image-bearing sheet O passes upwardly through a discharge chute.

The reflectographically exposed matrix web then passes downwardly around a sector of heating roll 39. This roll has tubular end trunnions (FIG. 6) journaled in bushings in partitions 2 and 2'. Trunnion 40 at the right end of the roll extends through thrust washer 42', flanged bushing 41', thrust collar 42, spring washer 43' and spocket 43. The sprocket interfits with the trunnion and is fastened to it so that upon rotation of the sprocket the heating roll rotates. Driving pin 44 in sprocket 43 extends through an opening in spring washer 43' and engages a hole in thrust collar 42 to insure that it rotates with the sprocket. During assembly, the spring washer is compressed, forcing the sprocket and heating roll to the right. The reactive force of the spring washer is resisted by thrust collar 42 which bears upon the right end of bushing 41', and thrust washer 42' resists the thrust of the roll toward the flange of bushing 41'. This construction fixes the location of the right end of the heating roll with respect to the machine frame while permitting the other end to expand or contract with temperature changes. Infrared lamp 45 is disposed in the center of the heated roll, and has suitable end supports 46 and 46'.

The matrix web containing polymerized areas then passes downwardly and backwardly around stripping blade 47, also extending between the vertical partitions. The deflected web then passes about 180° around a nip roll 48 (metal) and then about 180° around a resilient drive roll 49. The nip roll presses the web against the drive roll. The matrix web finally passes to a windup spool 50 where it is wound onto a core like that used for the original matrix web.

The matrix winding spool is supported by end caps 51 and 51' and is arranged to be driven by the arrangement shown in FIG. 8. End cap 51' is provided with an integral threaded spindle extension 52 which extends through bushing 53, collar 54, sprocket 55, clutch disc 56, thrust washer 57, spring 58, washer 59, and adjusting nuts 59a. Collar 54 is fixed to spindle extension 52 by pin 54'. Spindle 52 is able to rotate freely in bushing 53. Collar 54 provides a surface against which the sprocket 55 is forced by spring 58. Sprocket 55 is rotatably supported on spindle 52. Nuts 59a are threadably engaged with the spindle, and can be positioned axially on the spindle to compress spring 58 between thrust washer 57 and washer 59 to the degree desired. Sprocket 55 is thus frictionally grasped between fixed collar 54 and clutch disc 56 so that when sprocket 55 is rotated, spindle 52 and core 50 will rotate to wind up the exposed matrix.

In so doing the sprocket will slide (while rotating) between collar 54 and thrust washer 57. An integral key 57' of the thrust washer 57 projects into keyway 52' of spindle 52 to insure that the clutch disc rotates with the spindle. The other end of the wind-up core 50 is supported on a freely rotatable flange end cap 51 and associated parts which are similar to those used for core 5.

Upper chute member 60 extends upwardly from a point adjacent the upper periphery of exposure drum 32. The lower end of this chute is provided with end slots 61 through which pass sheet detection fingers 62. These fingers are fastened to switch pivot shaft 63 and the free ends pass through similar coacting elongated slots 61' in the bottom slanting surface of baffle 26. The switch pivot shaft extends from switch 64 mounted on one of the vertical partitions 35–35'. Upper return guide 66 for the opaque image-bearing sheet O extends downwardly toward the bottom periphery of the exposure drum. The guide is provided with end slots 67 through which there extend detection fingers 68 that are fastened to shaft 69 of switch 70, which is mounted on one of the vertical partitions 35–35'. A return guide plate 71 is disposed below the upper return guide 66, and the space between the upper return guide and the return guide plate constitutes a discharge chute for sheet O. The lower end of the return guide plate is provided with end slots 72 and the switch detection fingers extend through these slots as well as end slots 67. A bottom guide plate 73 extends in the same direction as guide plate 71 but has its lower section curved and its end is adjacent the periphery of the heated roll 39. Spring-loaded fingers 74 have their upper ends fastened to the bottom guide plate while their lower curved free ends can pass through suitable openings 75 in said plate to press against the surface of receptor sheet R. A lower feed chute 76 for receiving sheet R extends beneath bottom guide plate 73 and it is provided with end slots 77 through which there extend detection fingers 78 for detecting the presence of the ends of sheets R. These detection fingers are fastened to switch shaft 79 of switch 80 which likewise can be mounted on one of the vertical partitions 35–35'. Vertical guides 81 can be attached to cover 27.

Adjacent heating roll 39 and beneath the curved bottom portion of guide plate 73 is a pressure roll 82 which preferably is provided with heating means but can be unheated. This roll has a resilient, heat-resistant surface 83. It contains a tubular infared lamp 84. As shown in FIGS. 1A, 3, 5 and especially 13, integral tubular trunnions 85 and 85' projecting from each end of roll 82 are rotatably supported in bearings 86 and 86', fixed in triangularly shaped hangers 87 and 87', respectively. Each hanger is pivotally mounted on its respective vertical partition by means of shoulder screws 88 and 88'. These screws have a smooth cylindrical portion that serves as a pivot for the holes near the upper apex of the hangers. The shoulder screws have a threated outer end of reduced diameter for engagement with threaded holes in the partitions 35 and 35' and/or with nuts 89 and 89' in contact with the outer surface of the partitions. Infrared lamp 84 is supported by lamp holders 90 and 90' held respectively in bearings 86 and 86'. Thrust washers 91 and 91' carry thrust loads that may occur between roll 82 and either bearing. The gaps between the washers and their coacting bearings allow roll 82 to undergo thermal elongation without becoming jammed between the bearings.

Referring now primarily to FIG. 12, roll 82 is shown supported in hangers 87 and 87', adjacent to and spaced from roll 39. The maximum spacing between these rolls is limited by adjustable stops 92 and 92'. Toggle link 93 is pivotally engaged with pivot pin 94 fastened to a lobe of hanger 87 and with pivot pin 95 fastened to the outer end of toggle arm 96. Spring retaining rings 97 (FIG. 1A) retain the link on both pins. Toggle arms 96 and 96' are fastened to operating shaft 98, rotatably supported in slide blocks 99 and 99', which are slidably supported in rectangular slot 100 (FIG. 1A.) Compression springs 101 and 101' pressing against brackets 102 and 102' fastened to vertical partitions force the sliding blocks toward the end of the slots nearest to roll 39. Collars 103 are fastened by set screws (not shown) to opposite ends of operating shaft 98 to retain the slide-blocks in their slots. The operating shaft is provided with an extension 98a to which is fastened actuating lever 104. Pin 104a (FIG. 5) pivotably connects the lower ends of links 105 and 105' to the outer end of lever 104. The axes of pivot pins 95 and 95' and 104a are the same distance from the axis of the operating shaft and lie in the same plane. Collars 106 space the links from the actuating lever. The upper ends of links 105 and 105' are pivotably connected by pin 107 to the lower end of solenoid plunger 108. The plunger is arranged to reciprocate linearly through a limited stroke in a vertical direction within solenoid 109. Extension 110 integral with the plunger projects vertically upward through a clearance hole in the top of the solenoid. Compression springs 111 pressing against a portion of solenoid bracket 112 is arranged to push the plunger downward to break the toggle linkage 96 and 93 as shown in FIGS. 2, 3 and 12. Screws 113 fasten the solenoid bracket to the vertical partition 35.

Beneath the toggle device and heated pressure roll 82 is an exit chute 115 and spaced above it is guide plate 116. The lower feed chute and the upper guide plate serve also to enclose the pressure roll, toggle device and related parts.

With further reference to the resilient drive roll 49 and with particular reference to FIG. 9, one reduced outer bearing surface on this roll extends through a suitable bearing 117 in vertical partition 2'. The bottom end of the support is fastened to a suitable base angle 118 that is fastened to the base of the machine by screws, bolts, rivets, weldments or other suitable means. A double sprocket 119 is keyed to, or otherwise affixed to, the extension 120 of the resilient drive roll 49. The sprocket is provided with outer circumferential teeth 121 and inner circumferential teeth 121'. The vertical face of the sprocket serves as a contacting surface for the spring fingers 122 on hub 123 of a delaying device. A torsional spring 124 surrounds the hub. One end of the spring engages radial actuating lever 125 extending from and fastened to the hub. The other end of the spring is retained in a slot near one end of a slidable stop 126 that is mounted on solenoid 127. The other end of this stop is bent downwardly to engage the head of solenoid plunger 128. The opposite end of the plunger has a reduced cylindrical shaft portion 129 on which the free-wheeling hub can oscillate. A pin 130 near the outer end of the solenoid plunger serves as a contacting surface against which there presses retracting leaf spring 131 that is fastened to bracket 132 that is attached to the frame 133 of the solenoid assembly. As the actuating arm rotates, it contacts switch arm 134 on switch 135 to stop all machine functions after a preset delay.

As shown in FIG. 5, a gear motor 136 is fastened to the base 1 in a suitable manner. The shaft 137 from this gear motor bears driving sprocket 138 which, as shown in FIG. 3, drives continuous chain 139 that also meshes with the outer teeth 121 of double sprocket 119. A second continuous chain 140 meshes with the inner teeth of the double sprocket and this chain passes around sprocket 55 on the windup spool, then downwardly and partly around an idler sprocket 141 mounted on pintle 142 on the end of arm 143 that pivots on a shoulder screw 144 fastened to the adjacent vertical partition. The pivoted arm has an adjustment slot 145 through which there extends a similar shoulder screw 146 that threadably engages with the partition. The chain then passes around sprocket 43 on the end of the heating drive roll 39.

With particular reference to FIG. 6, the left end of heating roll 39 has the end cap spaced from the flange of bushing 41 to permit of longitudinal expansion when the temperature is raised. The end of the trunnion 40' of this roll presses against roller 147 that is mounted on pintle 148 which is attachesd near the upper end of the vertical arm of bell crank 149. Bracket 150, which is fastened to the adjacent vertical partition by means of screws 151 and intervening collars 152, has fixed to its upper end pivot pin 149a on which crank 149 is pivoted near the elbow. The horizontal arm of this bell crank has two spaced contact screws 153 and 154 mounted thereon. These screws extend through the arm and can be fixed in position by means of nuts 155. The lower ends of these screws contact the actuating plungers of respective spring biased switches 156 and 157 which are likewise attached to bracket 150 by means of screws 158.

As shown in FIGS. 2 and 4, the machine is provided with a centrifugal blower 159 which is mounted on the base in any suitable manner. Electrical switch 160 actuates the motor 159a forming part of the blower. Flexible hose conduit 161 is attached to the outlet end of this blower, and the other end of the conduit connects with the end of the square distribution tube 162 that extends through and between the vertical partitions. Air escape openings 163 are provided in the upper part of the distribution tube.

In order to prevent the hinged front cover of the machine from being opened when transfer pressure is applied to the heated pressure roll, spring loaded latches 164 are provided. They can be mounted on the outer surfaces of each of the vertical portions 35–35' by means of shaft 165 extending between and through the partitions. Pins 166 fixed to the upper end of the latches receive one end of tension springs 167, the other end being attached to pins 168 on the respective partitions. Latch blocks 169 are also mounted on partitions 2–2' and coact with the latches. Handle 170 extends from the shaft in a concealed location beneath the copy delivery chute to permit the hinged front cover to be unlatched and swung open.

As shown in FIG. 4, the vertical partitions are in two pieces and the upper part is fastened to the cover by suitable angle braces, or supports (not numbered) in any suitable way, e.g., by weldments. The bearings for the exposure drum, heated pressure roll, and metal nip roll are preferably attached to the upper part of the partition. When the front cover with the depending front baffle is raised, these rolls swing outwardly upon that part of the vertical partition which is attached to the cover. The remaining rolls i.e., heating roll, resilient drive roll and end caps for the windup spool are mounted on the lower part of the vertical partition. This construction is preferred and admits of easy loading and threading of the matrix web.

With reference to FIG. 11 of the drawing and with regard to the electrical circuit, the main switch 160 is a double pole, single throw, toggle switch which is used to "make" or "break" both lines of the alternating current supply entering the machine. Line 1 is protected with fuses ahead of the switch. Proceeding downward on the circuit diagram, the blower motor 159a is seen to be directly connected across $L_1$ and $L_2$ to operate as soon as the main switch is turned "on." The next circuit is the infrared lamp roll heater circuit. If the machine has been idle for a sufficiently long time, the image transfer rolls will be at room temperature and switches 156 and 157 will be mechanically undisplaced. The electrical circuit through switch 156 will be completed while the electrical circuit through switch 157 will not be completed. As a result, the coil of relay 171 will not be energized, the circuits through relay contacts $171C_1$ and $171C_2$ will be as shown by the solid lines, and each of the infrared lamps 45 and 84 will be connected across the line to draw full power to heat the rolls. As the rolls elongate due to thermal expansion, trunnion 40' will displace the follower roll 147, actuating switch 157 to energize relay 171. This changes the relay contacts 171C₁ and 171C₂ to the condition shown by the dotted lines, placing the lamps in series with each other. The voltage across each lamp is reduced to half of line voltage so that it will draw about one-half of the previous current. Power input to the lamps is thus reduced to about one-fourth. Heating and thermal elongation of the lamps continues at a reduced rate. When the desired operating temperature is attained, switch 156 will be actuated to break the circuit and turn the infrared lamps "off." As the rolls cool through use or loss of heat to the ambient, the roll will contract to periodically re-establish the low-power circuit through switch 156 to keep the rolls at the desired operating temperature.

When it is desired to make a copy, the original (O) is inserted into its chute, and the copy paper (R) is inserted into its chute. Insertion of the original actuates switch 64, closing the contacts therein. Insertion of the copy paper actuates switch 80, closing the normally open contacts therein. This establishes a permissive circuit in series with switch 172. Pressing the "copy" button (switch 172) completes the series circuit through the normally closed switch 135, energizing both relay 173 and 174. This closes holding contact 174C₁ in relay 174, bypassing the permissive "run" circuit and keeping relays 173 and 174 energized. Relay 173 lights the exposure lamp and relay 174 energizes gear motor 136 by completing the circuit through relay contact 174C₄. The matrix, propelled by the drive roll 49 and nip roll 48, in turn propels the original through the exposure region to produce a latent fascimile image of the original in the matrix. As the leading end of the original emerges from the exposure region, it actuates switch 70. This switch is in series with relay contact 174C₃, which has been closed due to energized condition of the relay. Actuation of switch 70 by the leading end of the original energizes solenoid 109 which actuates the pressure roll toggle linkage to press roll 82 against roll 39. Roll 82 begins rotating upon contact with roll 39 and propels the copy paper along guide plate 73 toward the heated rolls 39 and 82. Machine components have sizes and are so located that the leading end of the copy paper arrives at the nip between the two heated rolls at the same instant as the latent image of the leading end of the original. The relative unpolymerized area of the matrix switch constitutes a reproduction of the graphic image of the original (O) melt and adhere to the surface of the receptor sheet (R) with which they are in pressure contact between the heated rolls. After leaving the pressure region, the matrix and receptor proceed together toward the stripper blade 47 where the direction of travel of the thin matrix is abruptly changed as it passes around the sharp stripping edge of the blade. The stripping edge preferably has a uniform radius of no more than about .005" and should be arranged to operate at an elevated temperature, preferably above 70° C. to keep the relatively unpolymerized areas of the matrix coating in a molten condition until the copy or receptor sheet has been separated from the matrix. In a practical machine, the blade can be made of a durable material of low thermal conductivity, such as stainless steel, provided with a black oxide coating on the surface facing the heated metal roll to absorb radiation from it, and polished on the other side to minimize reradiation. It should be mounted to the machine frame in a manner which minimizes loss of heat by conduction to the frame. As the matrix proceeds around the sharp stripping edge with an abrupt change of direction, the inherent rigidity of the receptor sheet (even tissue or oinionskin paper) overcomes the tackiness of the molten coating and the receptor sheet continues to pass away from the stripping edge and proceeds along the curved exit chute 115 to emerge from the machine as a facsimile of the original. The copying operation continues as above, with a latent image of the original being formed in the matrix by reflectographic exposure to actinic light, followed by transfer of the less exposed areas of the matrix to the receptor sheet by the action of heat, pressure and stripping, until the ends of the original and receptor paper are reached. Termination of the original initiates no action, but termination of the copy paper allows switch 80 to reset, closing the circuit through relay contact 174C₂ (closed due to the energized condition of relay) to energize solenoid 127. This presses the spring fingers 122 against rotating sprocket 119 to rotate hub 123, until lever 125 actuates arm 134 of switch 135 to open the circuit and de-energize relays 173–174 to stop the drive motor, extinguish the exposure lamp, release to roll pressure and permit torsion spring 124 to reset memory device actuating lever 125. The exposure lamp circuit is arranged to put the fluorescent lamp in a "ready to run" standby condition when the main switch is turned "on." With the machine at a standstill but "on," relay 173C₁ is closed, permitting current to flow through fluorescent ballasts 176 and 177. With relay contact 173C₂ also closed, current will flow through the cathode heaters in the lamp, causing them to ionize the gas in the lamp thus placing it in a "ready to start" condition. When "copy" button is pressed, relay contact 173C₂ will open to force conduction through the lamp, and relay contact 173C₁ will open and compel part of the lamp current to flow through ballast 176 and a variable inductance 178. Changing the value of the variable inductance by manually rotating control handle 178a will change the intensity of the lamp to permit a variation in exposure. Capacitor 179. In the exposure lamp circuit is shown in FIGS. 4 and 11. It provides a pulse of energy for the exposure lamp in the event that relay contact 173C₂ opens at the precise instant that the instantaneous A.C. voltage is about zero.

The machine can also be provided with a suitable inspection light or lights, a rheostat for controlling the input to the heating roll and heated pressure roll, an instrument for continuously showing the amperage being consumed and with a light to show that the power circuit is closed. Alternatively, the exposure lamp can be operated continuously and the amount of exposure controlled by a variable aperture.

In order that the machine and its operation will be more readily understood, its purpose and explanation of what takes place in the zones and stations of the machine is now given.

The matrix supply zone of the machine can be readily understood from a study of the drawings and has been explained in detail above.

*The exposure zone*

In the exposure zone, the exposure lamp or lamps preferably are fluorescent lamps which emit light substantially uniformly throughout their entire length. These lamps are preferably made of glass which does not transmit ultraviolet radiation and does not discolor under its bombardment. These lamps can have an internal white reflecting layer, then a layer of phosphor, e.g., a calcium tungstate phosphor, that emits blue light with a peak emission at about 4100 A. Such lamp or lamps preferably have a clear, uncoated portion about ½" in width which extends for the full operative length thereof. Radiations pass through the clear area, and the amount of emitted radiation from such construction is generally about double that emitted from the surface of a non-apertured fluorescent lamp. The coacting exposure drum has an actinic radiation-reflecting surface, and preferably is white, to provide diffuse reflection; it may have a white coating or be white pigmented glass or plastic material, or a white ceramic roll.

The exposure lamp or lamps are in an electrical circuit arranged so that it or they will emit light radiations only when a copy is being made of a letter or document. More-over, the lamps can be provided with means so that they can operate at a variable and controllable intensity.

The image transfer zone

In the image transfer zone, there are located the heating transfer roll (which preferably has a metal surface) and the heated pressure roll (which has a resilient surface). The heating roll is mounted so as to rotate on a fixed center line at a surface speed equal to the matrix web speed. This roll, preferably, is driven and should be carefully made or machined so that it is of uniform diameter throughout its length and sufficiently rigid so as to deflect not more than a few thousandths of an inch under the required transfer pressure. It should be carefully polished and free from surface imperfections, e.g., nicks, holes, or ridges, that could cause local non-uniformity of the transfer pressure.

The heated pressure roll, likewise, should be of uniform size throughout its length. As stated above, it is provided with a resilient surface or coating of heat-resistant material, e.g., a silicone, rubber or polytetrafluoroethylene.

The heated pressure roll is mounted so that it can be pressed toward the transfer roll or retracted therefrom. This is accomplished by the toggle device described above. The toggle, as indicated previously, is operated by means of a solenoid which is energized electrically. As shown in FIGS. 1 and 1-A, upon energizing the solenoid, the toggle link assumes a straight position. This straightening of the toggle links pushes the heated pressure roll farther from the operating bar and toward the heating roll. The heated roll is forced into contact with the receptor sheet that is in surface contact with the imagewise-exposed matrix web on the heating roll. As the straightening action on the toggle device continues, the operating bar presses against compression spring 101–101'. These springs can be adjusted in accordance with the diameter and nature of the rolls to provide the desired transfer force. A roll-to-roll force of about 2–5 lbs. per sq. in. generally is adequate. The compression spring (111) which presses against the solenoid plunger is provided so that the toggle device will be returned to the angular or non-straight line condition shown in FIG. 2. This relieves the transfer pressure and retracts the pressure roll from pressure association with the heating roll.

The heated pressure roll is preferably not driven by power from the gear motor but is an idler and rotates only when it is in operative contact with the heating roller through the receptor sheet and matrix web. The spring-loaded fingers, which press indirectly on the heated pressure roll through the receptor sheet, also act as stops to locate the leading end of the receptor sheet at a predetermined point.

When the solenoid for the toggle device is energized and the heating roll rotates, the receptor sheet passes through the end of its chute under the curved guide portion and into the nip between the heating roll and the pressure roll.

The electrical controls of the machine are arranged to initiate the action just mentioned at the proper time so as to synchronize the leading end of the receptor sheet with the leading end of the latent image recorded in the matrix web. After passing over the stripping blade 47 which separates the matrix web from the receptor sheet, the latter proceeds through the exit chute to emerge from the machine as a facsimile copy of the letter or document.

The drive mechanism

As disclosed above, the machine is driven by an electrical gear motor which, in a practical machine, can have a shaft speed of about 30 r.p.m. The output shaft of this motor, as shown, has a sprocket which meshes with a chain to rotate the resilient drive roll 49. Instead of a chain drive, however, the output shaft of the motor may be arranged to drive said shaft directly through coacting gears or through a train of gears.

A chain drive is also provided for rotating the heated roll 39 and the windup spool for the matrix web. The slip clutch for the windup spool, or core, exerts a winding tension on the matrix web and compensates for the change in rotational speed as the web on the windup core increases in diameter.

In the machine as shown, the resilient drive roll 49 and the reating roll 39 preferably are positively driven by the chain drive meshing with the appropriate sprockets on their respective ends. These rolls are arranged to run at slightly different surface speeds so as to eliminate wrinkling of the thin, flexible matrix web due to thermal expansion or other causes. The resilient drive roll in general should propel the matrix web at a speed about 2% faster than the surface speed of the heating roll. This difference in speed serves to keep the matrix web taut while it passes over and around the deflecting blade 47, thus insuring proper separation of the matrix web from the receptor sheet. In practical machines the matrix web can travel at a speed of about 80 inches per minute.

The image transfer rolls

In the image transfer zone, the heating roll must quickly reach the operating temperature. Thus, the initial power input may be about 15 amp. at about 110 volts, and the input, after warm-up, regulated and economical as well as reliable. In general, the machine should provide for a fast warm-up and have a certain power level, followed by a lower power level to replace lost heat and to maintain operating temperature. In the machine described above, as shown in the drawings, the heating roll can be heated with a 650-watt T3 tubular quartz infrared lamp. Such a lamp is shown inside the reating roll and the other such lamp is located inside the heated pressure roll. With reference to the "transfer roll heaters" circuit of the electrical diagram FIG. 11, it will be noted that when the transfer rolls are at ambient temperature, both the heating lamps are subjected to full line voltage through the normally closed contact of switch 156, to draw the maximum desired wattage.

As the heating roll and the heated pressure roll approach operating temperature, they elongate due to thermal expansion, and this is compensated for by the end construction shown in the drawings and described above. A temperature rise of about 1° C., for example, will normally displace the end of the heating roll about $\frac{1}{1000}$ of an inch to the left, the right end of the roll being fixed as shown in FIG. 6. The small roller mounted on the end of the bell crank rides against the end of the trunnion of the heating roll. The bell crank pivots about the bar so that as the roll elongates, the horizontal arm of the bell crank is forced downwardly against the force of the return spring in the switches 156 and 157. The adjusting screw for switch 157, which swings through a shorter arc than that for switch 156, provides a compensating means to actuate switch 157 at a temperature of about 100° C. to place the two infrared lamps in series with each other and reduce the power input from the startup level (e.g., about 1300 watts) to a standby level of about 350 watts. Contact screw 153 provides a "fine" adjustment to detect the expansion of the heated roll to the desired set point and to trip the switch 156 and terminate the power input. As the heating roll cools, through loss of heat by conduction to the matrix web and the receptor sheet, etc., the switch eventually will reset and restore the energy input to replace the lost heat and to maintain the heating roll and the heated pressure roll at operating temperature.

The centrifugal blower provides a flow of air for cooling the machine. The flow of air is regulated by the square distribution tube, and the air which passes through the escape openings thereof cools the deflecting blade, its support and the exposure lamp. The flow of air through the distribution tube will prevent its temperature from rising more than a few degrees above ambient temperature, thus providing a reference length with which to compare the elongation of the heating roll 39.

In preparing the machine described above for operation, the back cover is pivoted about its hinge point to the open position. The front cover is likewise turned upon its hinge point to the open position. The matrix is then placed in the lightproof chamber and fixed on the endcaps by suitable adjustment of the adjustment knob. The matrix web with its transparent flexible support outermost is then threaded over the deflecting blade 38, over the heating roller and around the resilient drive roll and onto a core mounted on the endcaps therefor in the windup station. As the upper cover is returned to closed position, the remaining rolls come into proper position and establish the web path so that the machine is loaded and threaded for use.

The power switch is turned on and an original letter or document to be copied is then placed in the upper chute with its leading edge inserted under the bottom curved surface of the movable front baffle into the nip formed between the web and the exposure drum. The letter or document with its text facing upwardly faces the photothermographic coating on the web as it passes around the exposure drum. The matrix web and letter or document moves past the exposure lamp at uniform speed. Due to tension in the matrix web, the letter or document to be copied is firmly held between the surface of the web and the drum during the passage through the exposure zone. The reflectographic irradiation of the matrix web by radiations from the exposure lamp causes those areas of the matrix in contact with or opposite the white, or reflective, non-image areas of the original letter or document to become substantially polymerized. The areas in contact with the dark-image areas, e.g., printed letters, characters or lines, etc., of the letter or document, remain essentially non-polymerized as the dark-image areas absorb the radiation and do not reflect significant amounts of said radiation.

Simultaneously with the insertion of the letter or document to be copied, a receptor sheet, e.g., ordinary white or colored paper, is placed in the feed chute. A leading edge of the sheet first comes into contact with the detection fingers and then, as the heated pressure roll rotates, the receptor sheet is brought into contact with the surface of the matrix web as it passes around the heating roll. The original letter or document is separated from the imagewise-exposed matrix web before the web reaches the heating roll. Thus, the letter or document is deflected into the return chute.

In the transfer zone, the matrix web travels about 80° around the heating roll. The receptor sheet simultaneously travels about 75° around the heated pressure roll. The web and receptor sheet, while in contact, have a surface temperature suitable for image transfer whereby the thermally transferrable areas of the matrix web, which constitute the image of the text or other indicia or character on the letter or document, is transferred from the matrix web to the receptor sheet. The matrix web is then separated from the receptor sheet. This is accomplished as the web passes from the point between the heating roll and the heated pressure roll and around the stripper blade. The matrix then passes around the metal nip roll, around the driving roll and to the windup zone. The receptor sheet, with its transferred image record, is then removed from the return chute. The original letter or document can be reinserted in the machine simultaneously with a new receptor sheet to form an additional copy. Alternatively, of course, additional different pages of letters, documents or other sheets bearing indicia to be copied can be successively introduced into the machine and copies made thereof.

The various parts of the machine can be made from conventional materials of construction. The frame and covers can be made of metal including steel, steel alloys, aluminum, aluminum alloys, copper, brass, plastic materials, etc. They may be painted or provided with protective surfaces.

The chains, bearings, rolls, partitions and other parts can be made of conventional materials of construction. Many of the parts can be made by stamping or die-casting.

The various lamps, switches, relays, etc. can be obtained from conventional commercial sources.

While the machine shown above is designed primarily for office copy purposes for letter size or legal size sheets, it is not limited to such purposes, as pages from magazines, business forms and invoices of many and varied types and sizes can be copied. Maps, legal papers of all kinds, photographs, and photoprints can be readily copied. By changing the dimensions, relatively large or small image-bearing sheets can be copied. Rolls of image-bearing material and receptor sheets can be fed into and through the machine.

An advantage of the machine is that it requires no particular skill to operate it and it produces a dry copy in ten seconds or less. It does not require the use of chemical solutions or vapors. It is self-contained and portable and semi-automatic. It is extremely versatile and can be used to copy many kinds of image-bearing, e.g., typed, printed or engraved sheets, or even photographs of continuous tone or halftone or intaglio, etc.

Another advantage is that the machine is dependable in operation and durable. It does not involve any safety hazards as the parts are enclosed and the operating temperatures are similar to those encountered in thermographic or photographic copying machines.

Another advantage of the machines of this invention is that they are useful with the photothermographic webs described in Belgian Patent 593,834, February 6, 1961, Burg and Cohen U.S. Patent 3,060,023, and assignee's Burg and Cohen U.S. application Ser. No. 163,078 filed December 29, 1961, and Burg Ser. No. 156,538 filed December 1, 1961.

Still further advantages will be apparent from the foregoing description and the following claims.

We claim:

1. A photocopying machine comprising a base frame, vertical partitions, a light-proof chamber for a roll of matrix web and an exposure and thermal transfer chamber containing and supported by said partitions,
    (a) a tubular lamp that emits actinic light radiation,
    (b) an exposure drum for transporting said web and an opaque-image bearing sheet in superposition past said lamp, then around a heating roller,
    (c) deflecting means for deflecting said web from said sheet,
    (d) a roller for transporting said deflected web while in contact with a receptor sheet,
    (e) a pressure roll for pressing said web and sheet into surface contact and against said heating roller,
    (f) a deflecting means immediately adjacent the pressure and heating rollers for stripping said web from said sheet,
    (g) a nip roll for engaging said web with,
    (h) a resilient drive roll that propels said web to
    (i) a windup means.

2. A machine according to claim 1 provided with means for circulating cooling air therethrough.

3. A machine according to claim 1 wherein said pressure roll (e) is provided with means for heating the same.

4. A machine according to claim 1 wherein said partitions have means for holding said roll of web on a core and means for winding up the final web onto a core.

5. A machine according to claim 1 wherein said heating roller and pressure roll contain tubular infrared heating elements.

6. A machine according to claim 1 provided with means for actuating the tubular lamp while said image-containing sheet and web are in contact and deactuating it when they are not in contact.

7. A machine according to claim 1 provided with means for actuating the tubular lamp while said image-containing sheet and web are in contact and deactuating it when they are not in contact, and with means for effecting the heating of said rolls while said receptor sheet and matrix are in contact.

8. A machine according to claim 1 provided with means for actuating the tubular lamp while said image-containing sheet and web are in contact and deactuating it when they are not in contact, and with means for effecting the heating of said rolls while said receptor sheet and matrix are in contact, and with means for stopping the matrix web after the receptor sheet is deflected therefrom.

References Cited by the Examiner
UNITED STATES PATENTS

| | | | |
|---|---|---|---|
| 2,835,179 | 5/58 | Fairbank | 95—75 |
| 2,979,026 | 4/61 | Reuter | 95—1.7 |
| 3,044,386 | 7/62 | Limberger | 95—1.7 |
| 3,054,339 | 9/62 | Marcott | 95—75 |
| 3,060,023 | 10/62 | Burg et al. | 96—28 |
| 3,065,467 | 11/62 | Prevost | 95—77.5 X |
| 3,110,241 | 11/63 | Frantz et al. | 95—75 |
| 3,139,018 | 6/64 | Gold et al. | 95—77.5 |

EVON C. BLUNK, *Primary Examiner.*